United States Patent [19]
Seymour

[11] 3,734,707
[45] May 22, 1973

[54] PROCESS FOR REDUCING EMISSION OF DUST BY GRANULAR FERTILIZER COMPOSITIONS

[75] Inventor: James E. Seymour, Virgina Beach, Va.

[73] Assignee: Royster Company, Norfolk, Va.

[22] Filed: Oct. 22, 1970

[21] Appl. No.: 82,950

[52] U.S. Cl. .................................71/30, 71/64 DB
[51] Int. Cl..................................................C05c 7/00
[58] Field of Search.....................71/30, 64 DB, 64 E, 71/54, 58, 59

[56] References Cited
UNITED STATES PATENTS

| 3,398,191 | 8/1968 | Thompson et al. | 71/64 DA |
| 3,231,413 | 1/1966 | Berquin | 117/100 |
| 3,533,776 | 10/1970 | Coates et al. | 71/34 X |
| 2,092,054 | 9/1937 | De Rewal | 71/30 |

Primary Examiner—Reuben Friedman
Assistant Examiner—Richard Barnes
Attorney—Stoll and Stoll

[57] ABSTRACT

Emission of air-borne particulates by granular fertilizer compositions upon being moved or handled is substantially reduced by spraying the granules with aqueous solutions of nitrogen-containing salts at the end of the cooling phase of the manufacturing procedure.

22 Claims, 1 Drawing Figure

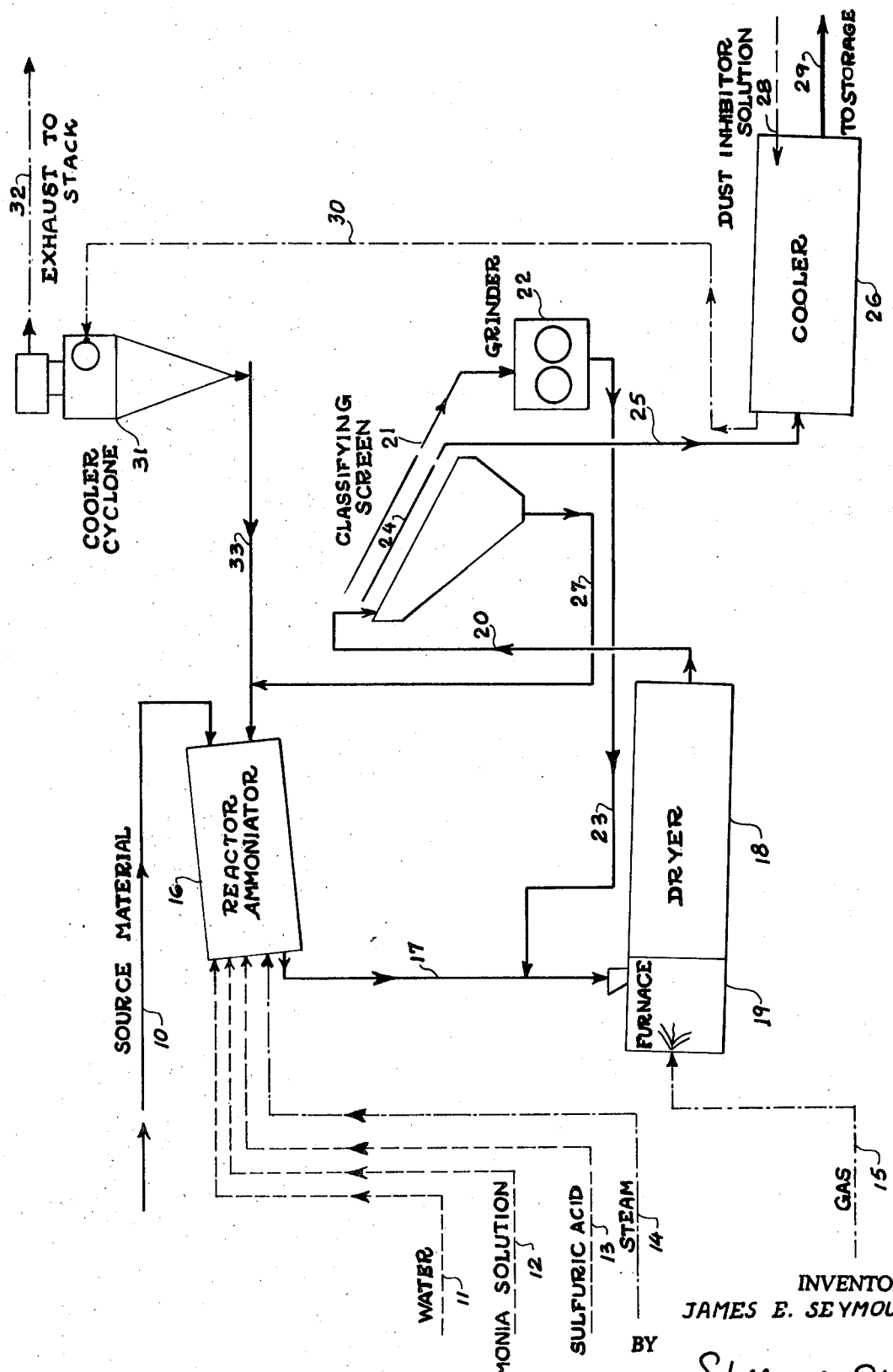

PROCESS FOR REDUCING EMISSION OF DUST BY GRANULAR FERTILIZER COMPOSITIONS

BACKGROUND OF THE INVENTION

1. Field of the Invention

The present invention pertains to new and useful processes for reducing air pollution due to fertilizer dust. More particularly, the invention relates to new and improved processes for manufacturing granular fertilizer compositions which have lessened tendencies to emit air-borne dust particles. The invention further relates to manufacturing processes for granular fertilizers having low dust forming characteristics which comprise spraying the granular fertilizer products with aqueous solutions of nitrogen-containing compounds at the output end of the cooler for the heat-dried product.

2. Description of the Prior Art

Emission of fertilizer dusts during the manufacture, handling, transfer, and use of such dry fertilizers is an increasingly serious problem. The present growing concern about atmospheric pollution and its possible ecological effects are much in evidence. Complete elimination of air-borne dust particles in exhaust stack gases of fertilizer manufacturing plants is most difficult. However, apparatus and methods for reducing the concentration of particulates in flue stack exhausts are well known in the fertilizer manufacturing industry. Such apparatus and methods include electrostatic precipitators, fabric filter collectors, scrubbers, and mechanical collectors such as wet and dry cyclone separators. A control system for preventing the discharge of wastes, including dusts and fumes, from fertilizer manufacturing plants, is described in Sackett, U.S. Pat. No. 3,499,731. The Sackett system uses both wet and dry cyclone separators and also scrubbers. It is also well known to employ water and aqueous solution sprays in incinerators and in dryers for granular materials to reduce the concentration of air-borne particulates. Karcher, U.S. Pat. No. 3,264,084, shows a dust eliminator employed in conjunction with a rotary dryer and the use of solutions of potassium hydroxide and ligno sulfonates to spray on the material in the dryer to control the dust.

Particle size, however, is the principal limiting factor in using dry cyclone separators for air-borne dust reduction. For particulates below 10 microns in diameter the separation efficiency for dry cyclones falls off rapidly. The more complex and more costly wet cyclone separators are also more efficient for removing fine particulates from air streams, but wet cyclones require additional equipment, such as scrubbers, to remove solids from the air stream, as is shown in the Sackett patent.

Dry cyclone separators are use in conjunction with the new and improve process for reducing the concentration of fertilizer dusts emitted in exhaust stack gases to the ambient atmosphere, which process is the subject matter of my copending application Ser. No. 83,105 which was filed on even date herewith.

The problem of dust emission in the handling and use of fertilizers has already been alleviated to some degree by the production and distribution of granular fertilizer products in place of the meal type products. However, inefficacious size classification operations coupled with attrition of the granules due to physical characteristics of the granules and the mechanical forces exerted thereon by material handling operations, perpetuate the formation of dusts and fine particulates. The small, fine particles of fertilizers readily become air-borne at material transfer points such as elevator hoppers or lifts, conveyor hoppers, elevators, conveyors, bulk loading and packaging operations.

SUMMARY OF THE INVENTION

The present invention provides an improved process for manufacturing granular fertilizers which emit substantially less air-borne dust upon handling, transport and use. The improved process comprises spraying the fertilizer granules with an aqueous solution of a nitrogen-containing salt at the output end of the cooler for the furnace-dried product. For best results, only the size-classified fraction of the heat-dried product enters the cooler feed so as to attain maximum coverage of the granule surface by the spray solution. The aqueous solution spray of the invention bonds the fine, dust-like fertilizer particles in the cooled product stream to one another and to relatively larger particles and thus serves to agglomerate fertilizer dust particles with the formation, in turn, of agglomerates having increased density, greater projected surface area, or both. As a result of the agglomeration there is a substantial reduction in the amount of fertilizer dust becoming air-borne upon handling, transport and use of the improved, granular fertilizer materials. Thus a final result of the present invention is a reduction in pollution of the atmosphere by fertilizer dust. Concomitantly with the above results, the aqueous spray solution of this invention adds plant food value to fertilizer compositions.

Accordingly, a principal object of the present invention is to provide an improved manufacturing process for reducing atmospheric pollution by air-borne fertilizers emitted as dust by granular fertilizers upon handling.

A companion object of the present invention is to provide a process for manufacturing granular fertilizers having reduced tendency to pollute the surrounding atmosphere with fertilizer dust.

A further object of the invention is to provide a manufacturing process for granular fertilizer products comprising furnace-drying the product and spraying a sized fraction of the fertilizer at the output end of the product cooler with an aqueous bonding agent for reducing the dust-forming character of the granular fertilizer products.

BRIEF DESCRIPTION OF THE DRAWING

The above and other objects and applications of the present invention are obtained by the process indicated in the single FIGURE of the accompanying drawing which forms a part of this application and as is subsequently described in detail herein.

DETAILED DESCRIPTION OF THE DRAWING AND OF A PREFERRED EMBODIMENT OF THE INVENTION

Referring now to the drawing which represents a diagrammatic flow sheet of an embodiment of the present process, line 10 supplies reactor-ammoniator 16 with particulate raw materials such as superphosphates, potassic ingredients, solid nitrogeneous ingredients, line 11 supplies water, line 12 supplies ammonia solution, line 13 supplies sulfuric acid, and line 14 supplies steam for (1) ammoniating the acidic components to form ammonium salts and (2) agglomerating the finely divided or comminuted particulates to form fertilizer granules. The partially granulated reaction mixture then passes through line 17 to the rotating drum dryer 18 which is heated by gas furnace 19 fed through gas line 15. From the dryer the fertilizer particulates pass through line 20 to classifying screen 21, from which the granules too large to pass through the screen move to grinder 22 from which the comminuted particulates are returned by line 23 and recycled to dryer feed line 17. The granules retained by the size screen 24 move through line 25 to air cooler 26 while the fine particles passed by the size screen are returned to the ammoniator by line 27 and recycled.

At the discharge end of rotary drum cooler 26 the fertilizer granules are sprayed with a nitrogen-containing dust inhibitor solution supplied through line 28. From cooler 26 the fertilizer granules, now surface treated with the dust inhibitor solution, pass through line 29 to bulk storage bins or package storage. The counterflowing air stream in the cooler passes through line 30 to the dry cyclone extractor 31, the exhaust of which is blown through line 32 to the exhaust stack and the fertilizer particles extracted from the cooler air stream are recycled by line 33 to the reactor-ammoniator 16.

In conventional processes for the manufacture of granular fertilizers it is often advantageous to classify the material stream after it is discharged from the dryer. Generally, the product size fraction is fed to the cooler or cooling operation where the temperature of the granular product is reduced prior to bulk or packaged storage. The oversize fraction is passed through an attrition or comminution apparatus such as a roll mill, cage mill, chain mill, or hammer mill and is recycled to the dryer. The hot, undersize fraction is recycled to the ammoniator.

The conventional cooling devices ordinarily used to cool granular fertilizer products include: fluidized bed or semifluidized bed coolers, tray coolers, and rotary drum coolers, the latter the most widely used type. In the rotary drum cooler, as the drum rotates about its longitudinal axis, the particulate fertilizer materials are lifted by a number of flights positioned at various angles with respect to the longitudinal axis and dropped through a counter-current flow of air.

In the process of the present invention, at the discharge end of the drum cooler the falling screen of fertilizer product is sprayed with an aqueous solution of a nitrogen-containing salt at the rate of 0.5 to 25 pounds of solution per ton of fertilizer product. The preferred nitrogen-containing salts include ammonium orthophosphates, ammonium polyphosphates, calcium nitrate, ammonium nitrate, urea, urea phosphate, urea nitrate, and mixtures thereof.

Because of a relatively low hygroscopicity and a negative or very low free moisture potential when hydrolysis occurs, a preferred anti-dust solution is an aqueous solution containing ammonium orthophosphate and ammonium polyphosphate in amounts such that the total nitrogen content of the dissolved salts is 10 percent by weight of the solution and the total phosphate content, expressed as $P_2O_5$, is 34 percent by weight of solution. The "10-34-0" dust inhibitor solution is a commercial product commonly used to prepare both liquid and suspension fertilizer compositions. Other commercially available nitrogen salt-containing solutions can also be used advantageously as dust inhibitor solutions in the present process. Suitable commercially available solutions include: 8-24-0, an aqueous solution of ammonium orthophosphate containing 8 percent nitrogen; 11-37-0, an aqueous solution of ammonium orthophosphate and ammonium polyphosphate containing 11 percent nitrogen; 190 (0-54-0), an aqueous solution of ammonium nitrate containing 19 percent nitrogen; 210 (0-60-0), an aqueous solution of ammonium nitrate containing 21 percent nitrogen; 280 (0-40-31), an aqueous solution of ammonium nitrate and urea containing 28 percent nitrogen; 300 (0-4-2-33), an aqueous solution of ammonium nitrate and urea containing 30 percent nitrogen; and 320 (0-4-4-35), an aqueous solution of ammonium nitrate and urea containing 32 percent nitrogen by weight of solution.

When the granular fertilizer material fed to the cooler is essentially the product size fraction resulting from the classification or screening operation the maximum liquid-to-solid contact and coverage is attained. As a result of surface tension and interfacial tension, coupled with mechanical forces exerted by the cooler or other handling equipment used for process treatment, the fine fertilizer particles adhere to one another and to larger particles. The inter-particle liquid phase bridge becomes an inter-particle salt bridge knitting particles firmly together as the liquid phase is reduced by evaporation, absorption, or adsorption. The fixing or bonding of the fine particles to larger particles that are too large or too dense to become air-borne under existing conditions, substantially reduces the emission of dust particles from granular fertilizer materials to the ambient atmosphere at material transfer points, loading stations, and packaging operations.

Although it is possible to reduce dust emission from granular fertilizers by the addition of as little as 0.5 pounds of the dust inhibitor solution as described, the granular material must be adequately sized and relatively non-porous with respect to the particle surface. The maximum amount of dust inhibitor solution required to produce the desired reduced dust emission varies with the total surface area of the granular product and the porosity thereof. Generally, the use of 25 pounds of dust inhibitor solution per ton of fertilizer product would be the maximum unless the granules are of high porosity, in which case more of the solution may be required. More than 25 pounds of solution per ton of product may also be required if the product is poorly sized, that is, if the amount of fines is high.

The following examples further illustrate the practice of the present invention:

EXAMPLE 1

A 6-24-24 granular fertilizer was treated by spraying, per ton of fertilizer, 9 pounds of an aqueous solution of ammonium orthophosphate and ammonium polyphosphate and containing 10 percent by weight nitrogen and 34 percent by weight $P_2O_5$ onto the falling screen of fertilizer at the discharge end of a rotary drum cooler. The treated 6-24-24 fertilizer product was transferred to bulk storage and subsequently transferred to a bagging station and bagged. The particulates emitted from the bagging operation were collected and weighed. A control run of granular 6-24-24 fertilizer not treated with a dust inhibitor solution was given identical handling, bagged, and the particulates emitted during the bagging operation were also collected and weighed. The bagging rate for both the treated and untreated runs was 50 tons per hour. The measured particulate emission for the product treated with the dust inhibitor solution was only 41.7 percent of the emission for the untreated product.

EXAMPLE 2

A 5–20–20 granular fertilizer product was treated by spraying, per ton of fertilizer, 9 pounds of an aqueous solution of ammonium orthophosphate and ammonium polyphosphate in concentrations such that the solution contained 10 percent by weight nitrogen equivalent and 34 percent by weight $P_2O_5$ onto the falling screen of product at the discharge end of a rotary drum cooler. The dust-inhibitor treated fertilizer product was transferred to bulk storage and subsequently was transferred to a bagging station where it was bagged. Very little dust loss was observed in handling through the elevator, on conveyors, and in chutes between bulk storage and the bagging operation. The particulates emitted from the bagging operation were collected and weighed. A control run of 5–20–20 granular fertilizer not treated with the dust inhibitor solution was given identical handling, was also bagged, the particulates emitted during bagging were collected and weighed. Copious emission of dust to the ambient atmosphere was observed at both the elevator feed hopper and the discharge of the elevator. The bagging rate for both the control run and the treated run was 22.5 tons per hour. The measured particulate emission for the dust-inhibited fertilizer product was 56.9 percent of the dust emitted by the untreated product.

EXAMPLE 3

The dust emitted by a 5–20–20 fertilizer product treated with dust inhibitor as described in Example 2 was measured as the material was dumped into an elevator feed hopper. The collecting probe was positioned 30 inches above the floor level grid over the hopper and 8 inches from the elevator wall. Dust emitted by an untreated control run was measured under the same conditions. The test data were as follows:

| Run No. | Material | Tonnage | collected sample Wt. -grains | Concentration grains/ft³ | dust grains/ ft³/ton |
|---|---|---|---|---|---|
| 1 | Untreated 5–20–20 | 5.2 | 0.0170 | 0.096 | 0.018 |
| 2 | 5–20–20 Treated with 9 lbs. 10–34–0 soln. per ton | 5.3 | 0.0093 | 0.052 | 0.010 |

The dust inhibitor treatment thus reduced the amount of fertilizer dust emitted when the product into the elevator loading hopper to 55.6 percent of the dust emitted by the untreated product under similar conditions.

EXAMPLE 4

A 5–10–30 granular fertilizer product was treated with dust inhibitor as described in Example 2 and the dust emitted by the product as it was dumped into an elevator feed hopper was collected and measured by a probe positioned as described in Example 3. The dust emitted by an untreated control run of 5–10–30 fertilizer was similarly collected and measured. The data obtained in this test comparison are as follows:

| Run No | Material | Tonnage | sample Wt. -grains ft³/ton | Concentration grains/ft³ | Grains/ |
|---|---|---|---|---|---|
| 1 | Untreated 5–10–30 | 5.2 | 0.0224 | 0.127 | 0.025 |
| 2 | 5–10–30 Treated with 9 lbs.10–34–0 soln. per ton | 5.1 | 0.0031 | 0.018 | 0.004 |

In the above comparison test the dust inhibitor treatment reduced the atmospheric dust concentration at the elevator hopper feed to 16 percent of the dust concentration produced by the untreated fertilizer material.

While the foregoing specification described the invention in detail, modifications and variations thereof will occur to those skilled in the art. It is to be understood therefore that the appended claims are intended to cover such modifications and variations which are within the scope and spirit of the invention.

I claim:

1. In the manufacture of fertilizer compositions, wherein fertilizer particulates are heat dried, size classified and air cooled, the process for rendering the fertilizer compositions resistant to emitting air-borne dust upon attrition, which comprises spraying the fertilizer particulates with an aqueous solution of a nitrogen-containing salt at the end of the air cooling phase of the manufacturing procedure to create an interparticle salt bridge between air-borne dust particles, and between air-borne dust particles and larger than air-borne particles.

2. The process according to claim 1, wherein the aqueous solution of a nitrogen-containing salt is sprayed upon the fertilizer particulates at the discharge end of the air cooler.

3. The process according to claim 1 in which the aqueous solution contains ammonium orthophosphate and ammonium polyphosphate.

4. The process according to claim 3 in which the nitrogen-containing salts are present in the solution in amounts such that the total nitrogen content of the dissolved salts is at least 10 percent by weight of the solution.

5. The process according to claim 4 in which the aqueous solution of nitrogen-containing salts is applied at the rate of about 8 to 10 pounds of solution per ton of granulated fertilizer composition.

6. The process according to claim 1 in which the aqueous solution contains about 44 percent by weight ammonium nitrate and about 35 percent by weight urea.

7. The method of reducing the concentration of fertilizer dust in the atmosphere by the manufacture of fertilizer particulates resistant to emitting air-borne dust upon attrition, which comprises heat-drying ammoniated phosphoric acid, air-cooling the dried phosphatic fertilizer, and spraying the air-cooled fertilizer particulates with an aqueous solution of a nitrogen-containing salt to create an interparticle salt bridge between air-borne dust particles, and between air-borne dust particles and larger than air-borne particles.

8. The process according to claim 7 in which the aqueous solution contains a mixture of ammonium orthophosphate and ammonium polyphosphate.

9. The process according to claim 8 in which the nitrogen-containing salts are present in the solution in amounts such that the total nitrogen content of the dissolved salts is at least 10 percent by weight of the solution.

10. The process according to claim 9 in which the aqueous solution of nitrogen-containing fertilizers is applied at the rate of about 0.5 to 25 pounds of solution per ton of granulated fertilizer composition.

11. The process according to claim 7 in which the aqueous solution contains about 44 percent by weight ammonium nitrate and about 35 percent by weight urea.

12. In the manufacture of fertilizer compositions, wherein fertilizer particulates are heat dried, size classified and air cooled, the process for rendering the fertilizer compositions resistant to emitting air-borne dust upon attrition, which comprises spraying the fertilizer particulates with an aqueous solution of a nitrogen-containing fertilizer at the end of the air cooling phase of the manufacturing procedure to create an interparticle salt bridge between air-borne dust particles, and between air-borne dust particles and larger than air-borne particles.

13. The process according to claim 12, wherein the aqueous solution of a nitrogen-containing fertilizer is sprayed upon the fertilizer particulates at the discharge end of the air cooler.

14. The process according to claim 12 in which the aqueous solution contains ammonium orthophosphate and ammonium polyphosphate.

15. The process according to claim 14 in which the nitrogen-containing fertilizers are present in the solution in amounts such that the total nitrogen content of the dissolved fertilizers is at least 10 percent by weight of the solution.

16. The process according to claim 15 in which the aqueous solution of nitrogen-containing fertilizers is applied at the rate of about 8 to 10 pounds of solution per ton of granulated fertilizer composition.

17. The process according to claim 12 in which the aqueous solution contains about 44 percent by weight ammonium nitrate and about 35 percent by weight urea.

18. The method for reducing the concentration of fertilizer dust in the atmosphere by the manufacture of fertilizer particulates resistant to emitting air-borne dust upon attrition, which comprises heat-drying ammoniated phosphoric acid, air-cooling the dried phosphatic fertilizer, and spraying the air-cooled fertilizer particulates with an aqueous solution of a nitrogen-containing fertilizer.

19. The process according to claim 18 in which the aqueous solution contains a mixture of ammonium orthophosphate and ammonium polyphosphate.

20. The process according to claim 19 in which the nitrogen-containing fertilizers are present in the solution in amounts such that the total content of the dissolved fertilizers is at least 10 percent by weight of the solution.

21. The process according to claim 20 in which the aqueous solution of nitrogen-containing fertilizers is applied at the rate of about 0.5 to 25 pounds of solution per ton of granulated fertilizer composition.

22. The process according to claim 18 in which the aqueous solution contains about 44 percent by weight ammonium nitrate and about 35 percent by weight urea.

* * * * *